United States Patent
Pulakka et al.

(10) Patent No.: US 11,991,448 B2
(45) Date of Patent: May 21, 2024

(54) DIGITAL ZOOM

(71) Applicant: Nokia Technologies Oy, Espoo (FI)

(72) Inventors: Hannu Juhani Pulakka, Pirkkala (FI); Lasse Juhani Laaksonen, Tampere (FI); Arto Juhani Lehtiniemi, Lempaala (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/720,772

(22) Filed: Apr. 14, 2022

(65) Prior Publication Data

US 2022/0337754 A1 Oct. 20, 2022

(30) Foreign Application Priority Data

Apr. 16, 2021 (EP) ..................................... 21168792

(51) Int. Cl.
*H04N 23/69* (2023.01)
*H04N 23/695* (2023.01)
*H04N 23/80* (2023.01)

(52) U.S. Cl.
CPC ........... *H04N 23/69* (2023.01); *H04N 23/695* (2023.01); *H04N 23/80* (2023.01)

(58) Field of Classification Search
CPC ...... H04N 23/69; H04N 23/695; H04N 23/80; H04N 23/631
See application file for complete search history.

(56) References Cited

U.S. PATENT DOCUMENTS

| | | | |
|---|---|---|---|
| 2011/0032412 A1 | 2/2011 | Higuchi | 348/345 |
| 2011/0075016 A1 | 3/2011 | Shimizu | 348/345 |
| 2015/0142884 A1* | 5/2015 | Veramendi | H04L 12/1813 |
| | | | 709/204 |
| 2017/0225621 A1 | 8/2017 | Shiohara | |
| 2021/0012566 A1 | 1/2021 | Kim et al. | |
| 2021/0192213 A1* | 6/2021 | Scott | G06T 7/11 |
| 2021/0289140 A1* | 9/2021 | Dolgin | H04N 23/631 |

FOREIGN PATENT DOCUMENTS

| | | |
|---|---|---|
| EP | 2 860 961 A1 | 4/2015 |
| EP | 3 720 112 A1 | 10/2020 |
| WO | WO 2020/131037 A1 | 6/2020 |

* cited by examiner

*Primary Examiner* — Yogesh K Aggarwal
(74) *Attorney, Agent, or Firm* — Harrington & Smith

(57) ABSTRACT

An apparatus including circuitry configured for obtaining a sequence of first images captured by an image sensor; circuitry configured for obtaining image metadata dependent upon a sequence of zoom levels, wherein the sequence of zoom levels is a sequence corresponding to the sequence of first images; circuitry configured for enhancing zoom including circuitry configured for: using the image metadata to obtain the sequence of zoom levels; smoothing the sequence of zoom levels to produce a smoothed sequence of zoom levels; creating a sequence of new images from the sequence of first images based on the smoothed sequence of zoom levels, wherein the smoothed sequence of zoom levels vary a size of a crop used on the sequence of first images to produce the sequence of new images; and circuitry configured for storing, displaying or transmitting the created sequence of new images.

17 Claims, 9 Drawing Sheets

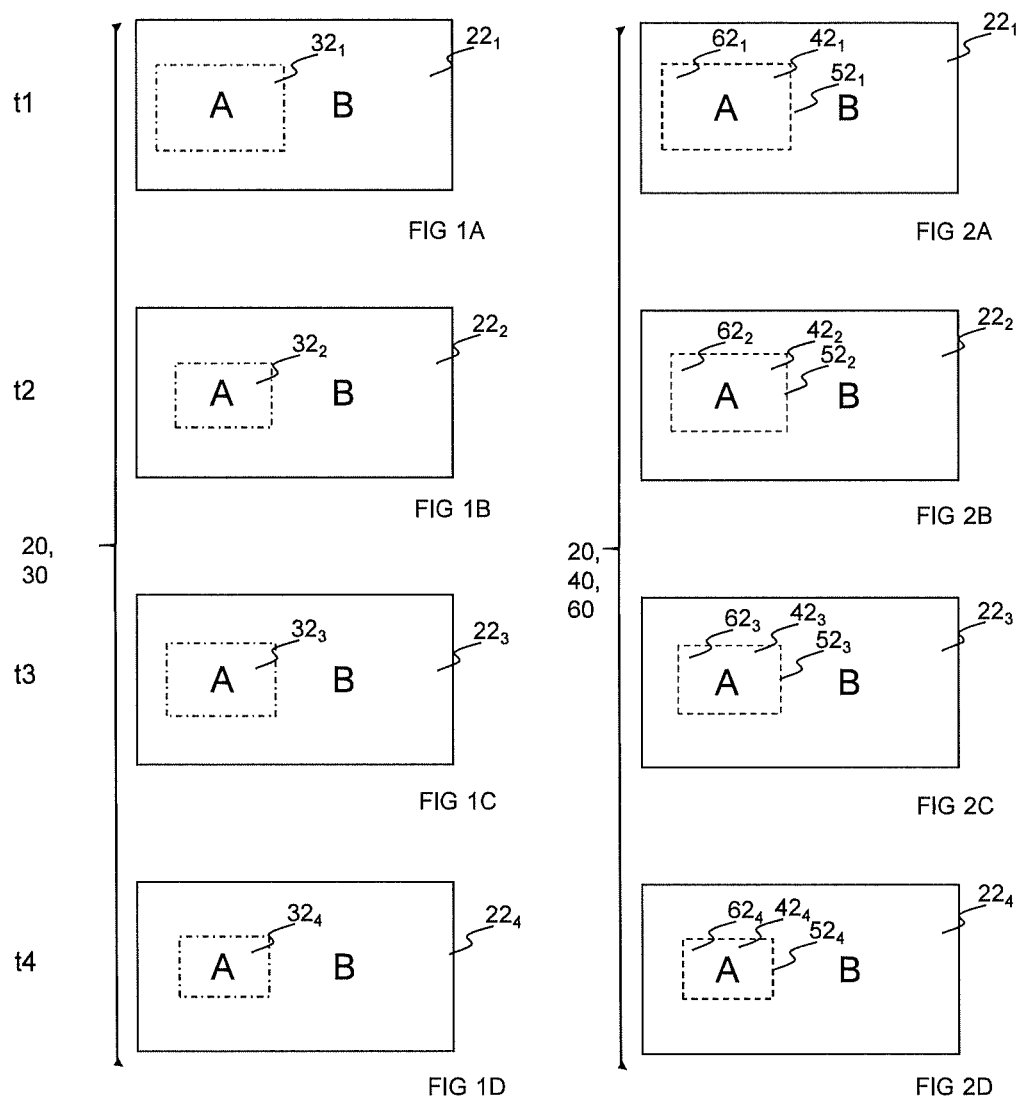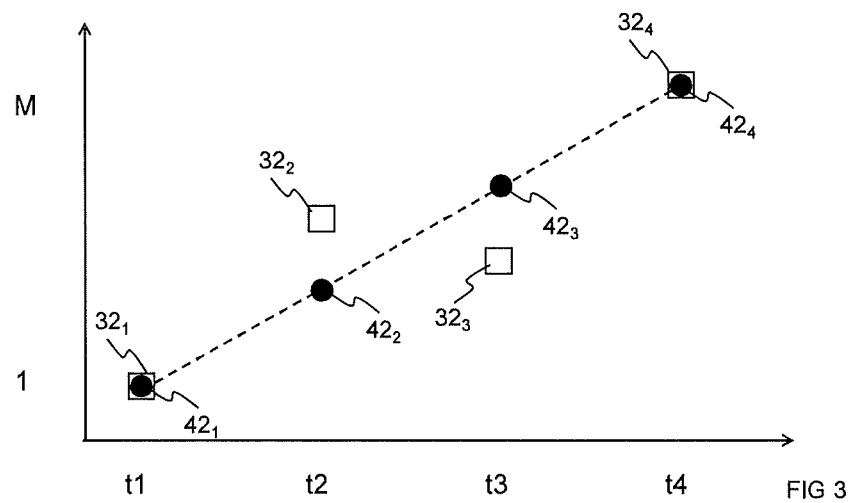

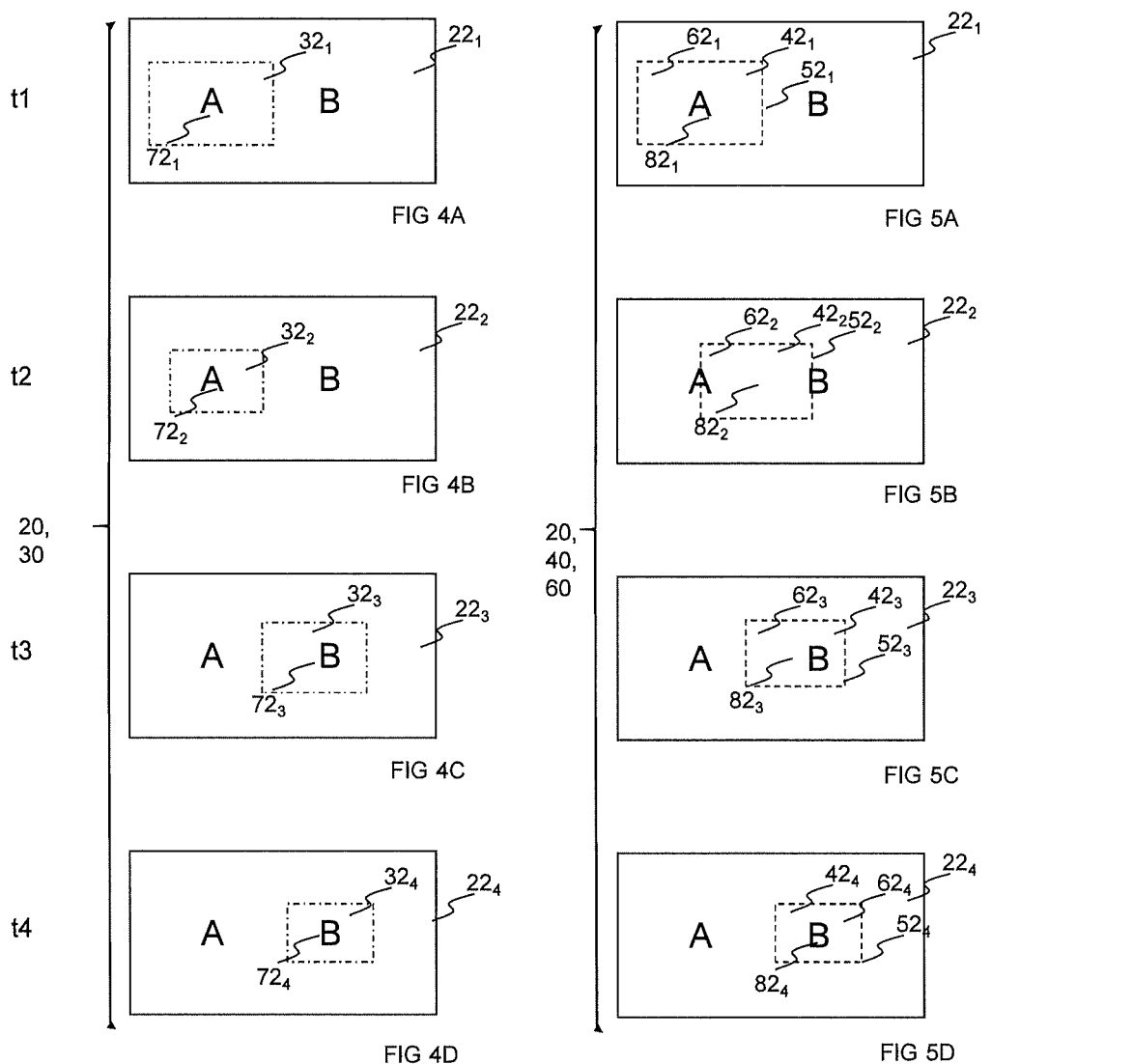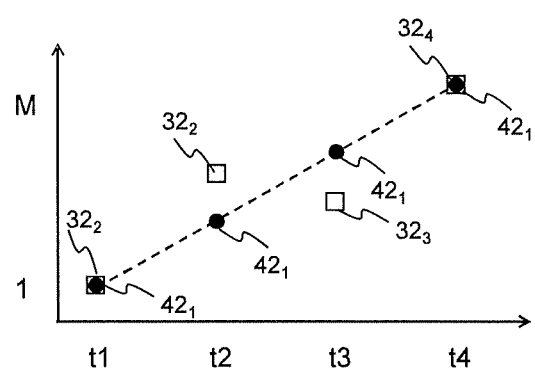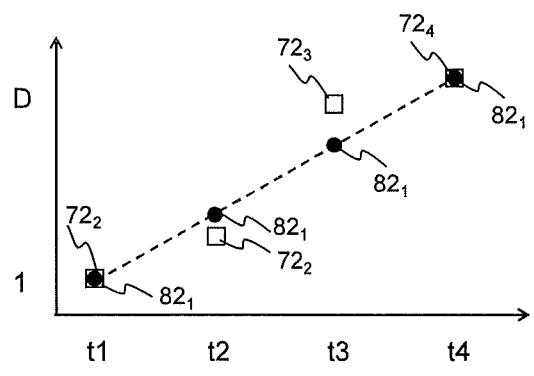

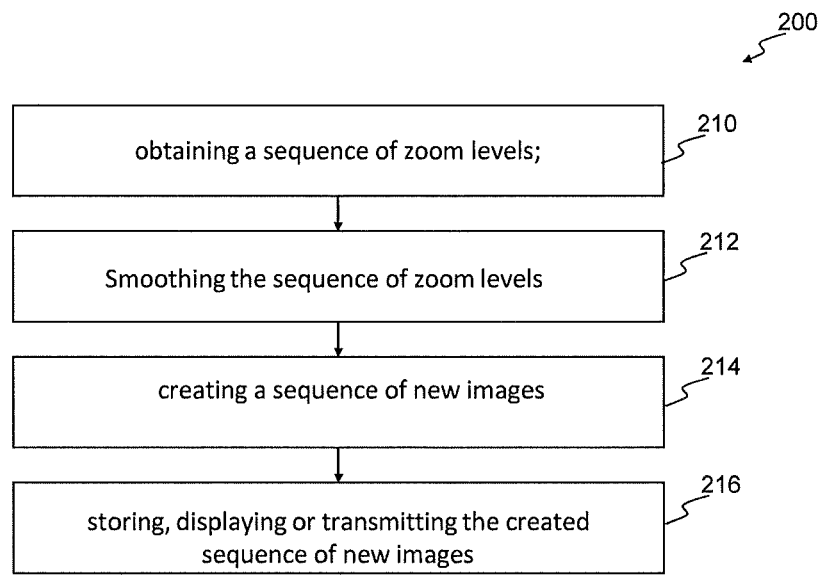
FIG 11
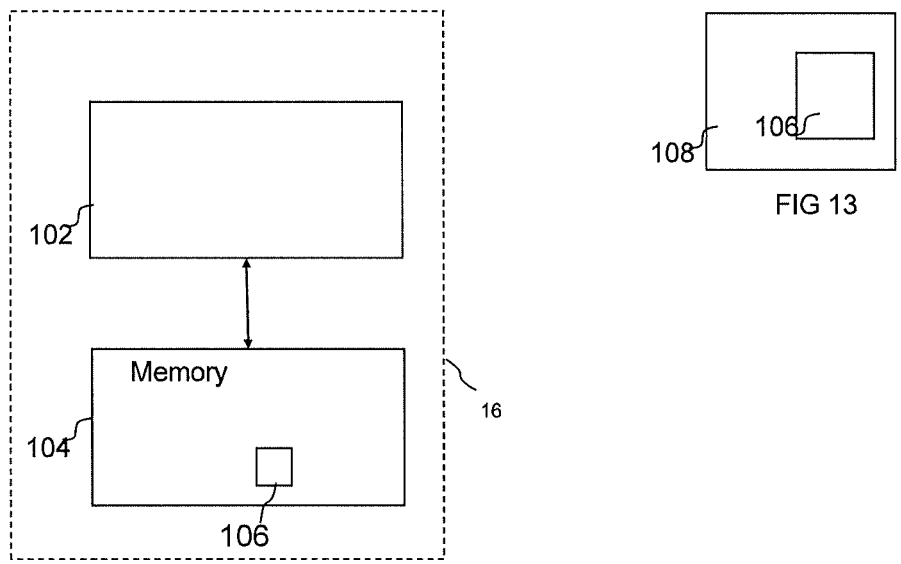
FIG 12
FIG 13

DIGITAL ZOOM

TECHNOLOGICAL FIELD

Embodiments of the present disclosure relate to digital zoom. Some examples relate to digital zoom during video capture.

BACKGROUND

In cameras that are enabled with optical zoom, a lens system changes the magnification of the image that falls on an image sensor. Increasing optical magnification, causes zoom-in without a change in resolution. Decreasing optical magnification, cause zoom-out without a change in resolution. In video cameras, the optical zoom can be performed manually or automatically while capturing video.

In cameras that are enabled with digital zoom, the image that falls on an image sensor is not varied for digital zoom, instead different sized portions of the image sensor are used to provide the image. Decreasing a size of the portion, causes zoom-in and a reduction in resolution as the ratio of sensels (sensor elements) to pixels (picture elements) decreases. Increasing a size of the portion, cause zoom-out and an increase in resolution as the ratio of sensels to pixels increases. In a video camera, the digital zoom can be performed manually or automatically while capturing video.

The control of zoom during capture of video can be difficult and the quality of the video produced can be low.

BRIEF SUMMARY

According to various, but not necessarily all, embodiments there is provided an apparatus comprising:
means for obtaining a sequence of first images captured by an image sensor;
means for obtaining image metadata dependent upon a sequence of zoom levels, wherein the sequence of zoom levels is a sequence corresponding to the sequence of first images;
means for enhancing zoom comprising means for:
using the image metadata to obtain the sequence of zoom levels;
smoothing the sequence of zoom levels to produce a smoothed sequence of zoom levels;
creating a sequence of new images from the sequence of first images based on the smoothed sequence of zoom levels, wherein the smoothed sequence of zoom levels vary a size of a crop used on the sequence of first images to produce the sequence of new images; and
means for storing, displaying or transmitting the created sequence of new images.

In some but not necessarily all examples, the apparatus comprises: means for creating the sequence of new images from the sequence of first images based on the smoothed sequence of zoom levels, varies a size and position of a crop used on the sequence of first images to produce the sequence of new images.

In some but not necessarily all examples, the image metadata defines a sequence of manual zoom levels selected by a user or the image metadata defines a sequence of manual viewfinder images selected by the user, a magnification of which defines a zoom level.

In some but not necessarily all examples, each of the first images in the sequence of first images comprises a second user-defined image defined by the zoom level of the corresponding sequence of zoom levels and additional image portions that extend beyond the second image, wherein the corresponding sequence of zoom levels defines a crop that defines the second images within the first images and wherein the metadata is dependent upon varying zoom levels defining the sequence of second images.

In some but not necessarily all examples, the second images are viewfinder images framed by a viewfinder used to indicate recording of the sequence of second images, while recording the sequence of first images.

In some but not necessarily all examples, the apparatus comprises:
means for tracking an object in the sequence of first images; and
means for creating the sequence of new images to include the tracked object within the new images.

In some but not necessarily all examples, the apparatus comprises: means for selecting the object to be tracked based upon at least a frequency of occurrence of the tracked object within a sequence of second user-defined images defined by the sequence of first images and the corresponding sequence of zoom levels, wherein the corresponding sequence of zoom levels defines a variable crop that defines the second images within the first images.

In some but not necessarily all examples, the apparatus comprises: means for selecting the object to be tracked based upon detection of changes in zoom levels within the sequence of zoom levels, that are responsive to the object leaving a sequence of second user-defined images defined by the sequence of first images and the corresponding sequence of zoom levels, wherein the corresponding sequence of zoom levels defines a variable crop that defines the second images within the first images.

In some but not necessarily all examples, the apparatus comprises:
means for tracking an object in the sequence of first images; and
means for creating the sequence of new images to exclude the tracked object within the new images.

In some but not necessarily all examples, the apparatus comprises: means for selecting the object to be tracked based upon at least a frequency of occurrence of the tracked object within a sequence of second user-defined images defined by the sequence of first images and the corresponding sequence of zoom levels, wherein the corresponding sequence of zoom levels defines a variable crop that defines the second images within the first images.

In some but not necessarily all examples, the apparatus comprises: means for selecting the object to be tracked based upon detection of changes in zoom levels within the sequence of zoom levels, that are responsive to the object entering a sequence of second user-defined images defined by the sequence of first images and the corresponding sequence of zoom levels, wherein the corresponding sequence of zoom levels defines a variable crop that defines the second images within the first images.

In some but not necessarily all examples, the apparatus comprises: means for enabling user selection of the object to be tracked.

In some but not necessarily all examples, the apparatus comprises: means for obtaining a sequence of further images captured by a further image sensor wherein a field of view of further images is different to a field of view of the first images, wherein the means for enhancing zoom comprises means for:
switching between creating a sequence of new images from the sequence of first images based on the smoothed sequence of zoom levels and creating a sequence of new images from the sequence of further images.

In some but not necessarily all examples, the apparatus comprises:
an image sensor for capturing the sequence of first images of a scene;
a manual zoom control for varying during capture of the sequence of first images, a zoom level used to define second images of the scene, the sequence of varying zoom level varying a magnification of the sequence of second images;
means for recording the sequence of first images captured by the image sensor that include the second images and extend beyond the second images;
means for recording the image metadata for the first images dependent upon the sequence of varying manual zoom levels.

According to various, but not necessarily all, embodiments there is provided a computer program that when run by at least one processor causes:
obtaining a sequence of zoom levels;
smoothing the sequence of zoom levels to produce a smoothed sequence of zoom levels;
creating a sequence of new images from a sequence of first images based on the smoothed sequence of zoom levels, wherein the sequence of first images is a sequence corresponding to the smoothed sequence of zoom levels and the smoothed sequence of zoom levels vary a size of a crop used on the sequence of first images to produce the sequence of new images; and
storing, displaying or transmitting the created sequence of new images with enhanced zoom.

According to various, but not necessarily all, embodiments there is provided examples as claimed in the appended claims.

BRIEF DESCRIPTION

Some examples will now be described with reference to the accompanying drawings in which:

FIGS. 1A to 1D illustrate an example of a sequence of zoom levels for a sequence of first images and FIGS. 2A to 2D illustrate an example of a smoothed sequence of zoom levels for the sequence of first images;

FIG. 3 illustrates the sequence of zoom levels and the corresponding smoothed sequence of zoom levels used in FIGS. 1A to 1D and 2A to 2D;

FIGS. 4A to 4D illustrate an example of a sequence of zoom levels and positions for a sequence of first images and FIGS. 2A to 2D illustrate an example of a smoothed sequence of zoom levels and positions for the sequence of first images;

FIGS. 5A to 5D illustrate the example of the sequence of first images captured by an image sensor as illustrated in FIGS. 4A to 4D;

FIG. 6A illustrates the sequence of zoom levels and the corresponding smoothed sequence of zoom levels used in FIGS. 4A to 4D and 5A to 5D and FIG. 6B illustrates the sequence of zoom positions and the corresponding smoothed sequence of zoom positions used in FIGS. 4A to 4D and 5A to 5D;

FIG. 11 illustrates an example of a method;

FIG. 12 illustrates an example of a controller;

FIG. 13 illustrates an example of a computer program;

DEFINITIONS

Figure 7A:
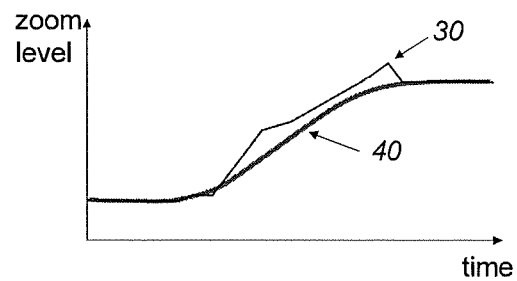
FIGS. 7A to 7D illustrate different examples in which a sequence of zoom levels is smoothed to produce a corresponding smoothed sequence of zoom levels.
Figure 7B:
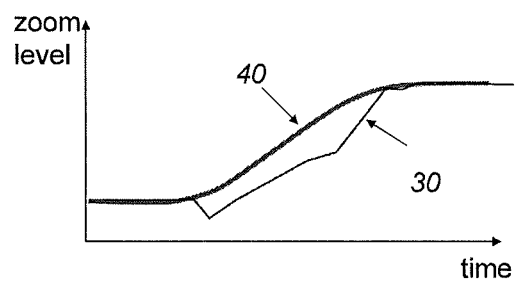
Figure 7C:
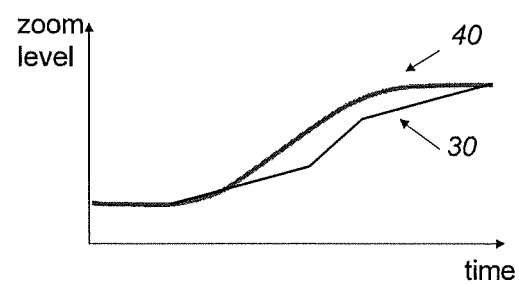
Figure 7D:
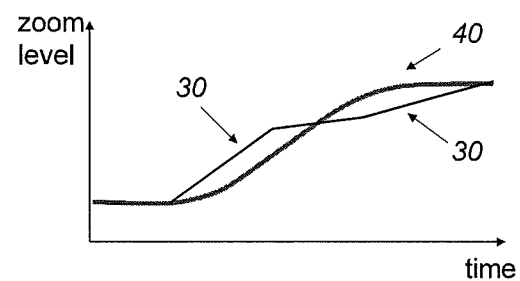

The following description refers, for example, to a sequence 20 of first images $22_i$, a sequence 30 of zoom levels $32_i$, a smoothed sequence 40 of zoom levels $42_i$, a sequence 60 of new images $62_i$, a sequence 70 of positions $72_i$ and a smoothed sequence 80 of zoom levels $82_i$.

The individual first images $22_i$ can be referenced using a sub-script. The group of first images 22 in the sequence 20 can be referenced without a subscript. The individual zoom levels $32_i$ can be referenced using a sub-script. The group of zoom levels 32 in the sequence 30 can be referenced without a subscript. The individual zoom levels $42_i$ can be referenced using a sub-script. The group of zoom levels 42 in the smoothed sequence 40 can be referenced without a sub-script. The individual new images $62_i$ can be referenced using a sub-script. The group of new images 62 in the sequence 60 can be referenced without a subscript. The individual positions $72_i$ can be referenced using a sub-script. The group of positions 72 in the sequence 70 can be referenced without a subscript. The individual positions $82_i$ can be referenced using a sub-script. The group of positions 82 in the sequence 80 can be referenced without a subscript.

Sequences are corresponding if they are synchronized. A member of a sequence corresponds to a member of another sequence if the members relate to the same (or substantially the same) time instance.

Thus, a first image $22_i$ is captured at a particular time. The corresponding zoom level $32_i$ was in use at that particular time. The corresponding zoom level $42_i$ is for use with that first image $22_i$ to produce a corresponding new image $62_i$. In some examples, the corresponding position $72_i$ for the zoom was in use at that particular time. The corresponding position $82_i$ is for use with that first image $22_i$ to produce the corresponding new image $62_i$. The same sub-script index is used to reference corresponding members of corresponding sequences.

DESCRIPTION

FIGS. 1A, 18, 1C, 1D illustrate an example of a sequence 20 of first images 22 captured by an image sensor 12.

A sequence 30 of zoom levels 32 is a sequence corresponding to the sequence 20 of first images 22.

The first image $22_1$ is captured at time t1. The zoom level $32_1$ defines a size of a notional crop that defines a notional image at time t1. In some examples, but not necessarily all examples, the notional image is a user-defined image displayed in a viewfinder display to a user controlling capture of the first image $22_1$ at time t1.

The first image $22_2$ is captured at time t2. The zoom level $32_2$ defines a size of a notional crop that defines a notional image at time t2. In some examples, but not necessarily all examples, the notional image is a user-defined image displayed in a viewfinder display to a user controlling capture of the first image $22_2$ at time t2.

The first image $22_3$ is captured at time t3. The zoom level $32_3$ defines a size of a notional crop that defines a notional image at time t3. In some examples, but not necessarily all examples, the notional image is a user-defined image displayed in a viewfinder display to a user controlling capture of the first image $22_3$ at time t3.

The first image $22_4$ is captured at time t4. The zoom level $32_4$ defines a size of a notional crop that defines a notional image at time t4. In some examples, but not necessarily all examples, the notional image is a user-defined image displayed in a viewfinder display to a user controlling capture of the first image $22_4$ at time t4.

The sequence 30 of zoom levels 32 is illustrated in FIG. 3 which plots magnification against time. It can be seen that the zoom level 32 changes in a jerky fashion between time t1 and t4. The zoom-level changes significantly (increases in this example) between times t1 and t2. It can be seen that the zoom-level changes less between t2 and t3, in fact, the zoom-level changes direction reverses and decreases in this example between times t2 and t3. It can be seen that the zoom-level changes significantly (increases in this example) between times t3 and t4.

FIGS. 2A, 2B, 2C, 2D also illustrate the same sequence 20 of first images 22 captured by an image sensor 12. These figures illustrate an enhancement of the sequence 30 of zoom levels 32. The sequence 30 of zoom levels 32 is smoothed to produce a smoothed sequence 40 of zoom levels 42.

The smoothed sequence 40 of zoom levels 42 is illustrated in FIG. 3. It can be seen that the zoom level 42 changes in a smooth manner between time t1 and t4. The zoom-level changes in the same sense between time t1 and time t2 (increases in this example). In the example illustrated the change in zoom level 42 in the smoothed sequence is linear but this is not always the case.

A sequence 60 of new images 62 is created from the sequence 20 of first images 22 based on the smoothed sequence 40 of zoom levels 42. The smoothed sequence 40 of zoom levels 42 vary a size of a crop 52 used on the sequence 20 of first images 22 to produce the sequence 60 of new images 62.

The first image $22_1$, captured at time t1, is cropped by crop $52_1$ to produce the new image $62_1$. The first image $22_2$, captured at time t2, is cropped by crop $52_2$ to produce the new image $62_2$. The first image $22_3$, captured at time t3, is cropped by crop $52_3$ to produce the new image $62_3$. The first image $22_4$, captured at time t4, is cropped by crop $52_4$ to produce the new image $62_4$.

FIGS. 4A, 4B, 4C, 4D illustrate an example of a sequence 20 of first images 22 captured by an image sensor 12.

A sequence 30 of zoom levels 32 is a sequence corresponding to the sequence 20 of first images 22.

The first image $22_1$ is captured at time t1. The zoom level $32_1$ defines a size of a notional crop that defines a notional image at time t1. A zoom position $72_1$ defines a position of the notional crop that defines the notional image at time t1. In some examples, but not necessarily all examples, the notional image is a user-defined image displayed in a viewfinder display to a user controlling capture of the first image $22_1$ at time t1.

The first image $22_2$ is captured at time t2. The zoom level $32_2$ defines a size of a notional crop that defines a notional image at time t2. A zoom position $72_2$ defines a position of the notional crop that defines the notional image at time t2. In some examples, but not necessarily all examples, the notional image is a user-defined displayed in a viewfinder display to a user controlling capture of the first image $22_2$ at time t2.

The first image $22_3$ is captured at time t3. The zoom level $32_3$ defines a size of a notional crop that defines a notional image at time t3. A zoom position $72_3$ defines a position of the notional crop that defines the notional image at time t3. In some examples, but not necessarily all examples, the notional image is a user-defined displayed in a viewfinder display to a user controlling capture of the first image $22_3$ at time t3.

The first image $22_4$ is captured at time t4. The zoom level $32_4$ defines a size of a notional crop that defines a notional image at time t4. A zoom position $72_4$ defines a position of the notional crop that defines the notional image at time t4. In some examples, but not necessarily all example, the notional image is a user-defined displayed in a viewfinder display to a user controlling capture of the first image $22_4$ at time t4.

The sequence 30 of zoom levels 32 is illustrated in FIG. 6A which plots magnification against time. It can be seen that the zoom level 32 changes in a jerky fashion between time t1 and t4. The zoom-level changes significantly (increases in this example) between times t1 and t2. It can be seen that the zoom-level changes less between t2 and t3, in fact, the zoom-level changes direction reverses and decreases in this example between times t2 and t3. It can be seen that the zoom-level changes significantly (increases in this example) between times t3 and t4.

The sequence 70 of zoom positions 72 is illustrated in FIG. 6B which plots zoom position 72 against time. It can be seen that the zoom position changes in a jerky fashion between time t1 and t4. The zoom position changes significantly between times t2 and t3. It can be seen that the zoom-level changes less between t1 and t2 and between t3 and t4.

FIGS. 5A, 5B, 5C, 5D also illustrate the example of the sequence 20 of first images 22 captured by an image sensor 12 as illustrated in FIGS. 4A to 4D. These figures illustrate an enhancement of the sequence 30 of zoom levels 32. The sequence 30 of zoom levels 32 is smoothed to produce a smoothed sequence 40 of zoom levels 42. Also the sequence 70 of zoom positions is smoothed to produce a smoothed sequence 80 of zoom positions 82.

The smoothed sequence 40 of zoom levels 42 is illustrated in FIG. 6A. It can be seen that the zoom level 42 changes in a smooth manner between time t1 and t4. The zoom-level changes in the same sense between time t1 and time t2 (increases in this example). The zoom level changes more in some time intervals and less in others. In the example illustrated the change in zoom level 42 in the smoothed sequence 40 is linear but this is not always the case.

The smoothed sequence 80 of zoom positions 82 is illustrated in FIG. 6B. It can be seen that the zoom position 82 changes in a smooth manner between time t1 and t4. The zoom position changes more in some time intervals and less in others. In the example illustrated the change in zoom position 82 in the smoothed sequence 80 is linear but this is not always the case.

A sequence 60 of new images 62 is created from the sequence 20 of first images 22 based on the smoothed sequence 40 of zoom levels 42 and the smoothed sequence 80 of zoom positions 82. The smoothed sequence 40 of zoom levels 42 vary a size of a crop 52 used on the sequence 20 of first images 22 to produce the sequence 60 of new images 62. The smoothed sequence 80 of zoom positions 82 vary a position of the crop 52 used on the sequence 20 of first images 22 to produce the sequence 60 of new images 62.

The first image $22_1$, captured at time t1, is cropped by crop $52_1$ to produce the new image $62_1$. The first image $22_2$, captured at time t2, is cropped by crop $52_2$ to produce the new image $62_2$. The first image $22_3$, captured at time t3, is cropped by crop $52_3$ to produce the new image $62_3$. The first image $22_4$, captured at time t4, is cropped by crop $52_4$ to produce the new image 624.

The zoom position $72_i$, $82_i$ can for example be defined as a centrum of the crop.

FIGS. 7A, 7B, 7C, 7D illustrate different examples of a plot against time comprising a sequence 30 of zoom levels 32 and a corresponding smoothed sequence 40 of zoom levels 42.

The sequence 30 of zoom levels 32 and the smoothed sequence 40 of zoom levels 42 both correspond to a sequence 20 of first images 22.

In these examples, but not necessarily all examples, the smoothed sequence 40 of zoom levels 42 has a rate of change (first differential with respect to time) that does not change sign. In the examples illustrated the zoom levels 42 increase over the period of smoothing and the rate of change does not change polarity, it remains positive. However, in other examples the zoom levels 42 could decrease over the period of smoothing and then the rate of change would not change polarity, it remains negative.

In these examples, but not necessarily all examples, the smoothed sequence 40 of zoom levels 42 has a rate of change (first differential with respect to time) that increases in magnitude and then decreases in magnitude. In the examples illustrated the zoom levels 42 increase over the period of smoothing and the rate of change becomes increasingly positive and then decreasingly positive. However, in other examples the zoom levels 42 could decrease over the period of smoothing and the rate of change becomes increasingly negative and then decreasingly negative.

In these examples the smoothed sequence 40 of zoom levels 42 has a substantially sigmoid shape.

In these examples the smoothed sequence 40 of zoom levels 42 is a monotonic zoom-in (entirely non-decreasing zoom levels). In other examples the smoothed sequence 40 of zoom levels 42 is a monotonic zoom-out (entirely non-increasing zoom levels).

Smoothing the sequence 30 of zoom levels 32 to produce a smoothed sequence 40 of zoom levels 42 can comprise adjusting zoom levels that, in sequence, do not vary monotonically so that, in sequence, they do vary monotonically.

Smoothing the sequence 30 of zoom levels 32 to produce a smoothed sequence 40 of zoom levels 42 can comprise determining a trend in the zoom levels and using the trend to determine the smoothed sequence 40 of zoom levels 42

Smoothing the sequence 30 of zoom levels 32 to produce a smoothed sequence 40 of zoom levels 42 can comprise removing sudden changes in zooming levels for example by using a moving average filter of fixed or variable size.

Although FIGS. 7A to 7D relate primarily to the smoothing of zoom levels 32 as previously illustrated in FIGS. 3 and 6A, similar FIGS. and comments also apply to the smoothing of zoom positions 72 as previously illustrated in FIG. 6B.

In the preceding examples, each of the first images 22 in the sequence 20 of first images 22 comprises a user-defined image defined by the zoom level 32 of the corresponding sequence 30 of zoom levels 32. The user-defined image is defined by a size and position of a notional crop within the first image 22. The user-defined images are, for example, viewfinder images framed by a viewfinder, such as a viewfinder display, used to indicate recording of the sequence of user-defined images, while recording the sequence 20 of first images 22. The user-defined images, displayed in the viewfinder, can be used by the user to control capture of the first images 22.

Metadata 90 can be recorded while recording the sequence 20 of first images 22. The metadata is dependent upon the sequence 30 of varying zoom levels 32 defining the sequence of user-defined images.

As the notional crop is only a portion of the first image 22, the first image 22 comprises 'external' portions that extend beyond the user-defined image in all directions. The external portions of the first image provide an "available zone" into which a smoothed zoom level 42 can move.

In some examples, the first image 22 is a full image captured by an image sensor 12. In other examples, the first image 22 is a portion of a full image that could be captured by the image sensor 12.

If the full image is stored, then cropping in post-processing (e.g., for smoothed zoom) can be achieved by cropping the full image. For example, the first images 22 can be a full image captured by the image sensor 22 that is cropped in post processing if the user chooses to use the smooth zooming options in post processing.

If the full image is not stored (the store first image 22 being a cropped portion of the full image), then cropping in post-processing (e.g., for smoothed zoom) means further cropping the cropped first image 22. For example, the first images 22 can be a cropped portion of the full image captured by the image sensor 22. The already cropped first images 22 can then be cropped further in post processing to achieve smooth zooming.

Choosing the area for cropping (e.g., using object tracking) can be important so that desirable visual objects (e.g., those visible when user has zoomed in and stopped changing the zoom) are maximally visible after the smoothed zoom.

The first image 22 could be the user-defined image plus the external portions (available zone). The size of the external portions (available zone) could be fixed. Alternatively, they could increase in response to user action such as panning or tilting the image sensor or performing a zoom-out. The size of the external portion (available zone) could be larger as a speed of camera movement (pan/tilt) increases and/or as a speed of zoom-out increase. The size of the external portions (available zone) could decrease in response to user action such as slowing or stopping panning or tilting the image sensor or slowing a zoom-out or performing a zoom-in.

Figure 8:
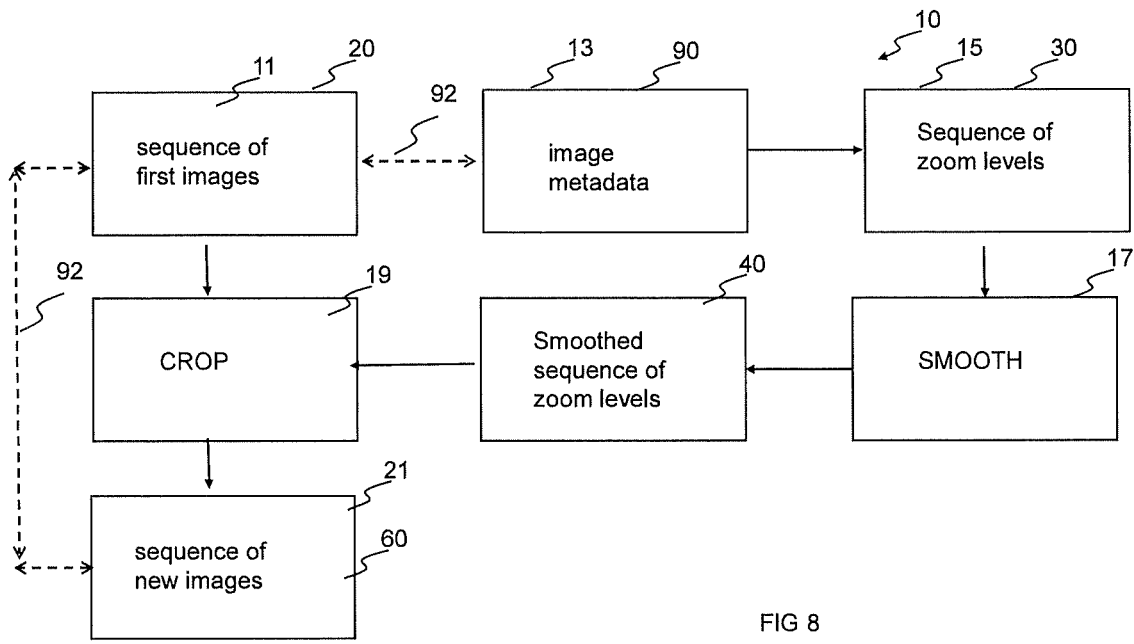
FIG. 8 illustrates an example of an apparatus as functional blocks.

FIG. 8 illustrates an example of an apparatus 10 for smoothing zoom levels as previously described. The apparatus 10 can be a camera apparatus or an apparatus comprising one or more cameras, such as for example, a mobile telephone or a computer.

The apparatus 10 comprises means 11 for obtaining a sequence 20 of first images 22 captured by an image sensor;

means 13 for obtaining image metadata 90 dependent upon a sequence 30 of zoom levels 32, wherein the sequence 30 of zoom levels 32 is a sequence corresponding 92 to the sequence 20 of first images 22; and means for enhancing zoom.

The means for enhancing zoom comprises:

means 15 for using the image metadata 90 to obtain the sequence 30 of zoom levels 32;

means 17 for smoothing the sequence 30 of zoom levels 32 to produce a smoothed sequence 40 of zoom levels 42;

means 19 for creating a sequence 60 of new images 62 from the sequence 20 of first images 22 based on the smoothed sequence 40 of zoom levels 42, wherein the smoothed sequence 40 of zoom levels 42 vary a size of a crop 52 used on the sequence 20 of first images 22 to produce the sequence 60 of new images 62; and means 21 for storing, displaying or transmitting the created sequence 60 of new images 62.

In some examples, the apparatus 10 can additionally comprise means for obtaining the sequence 70 of zoom positions 72 of zoom crops; means 17 for smoothing the sequence 70 of zoom positions 72 to produce a smoothed sequence 80 of zoom positions 82;

and means 19 for creating a sequence 60 of new images 62 from the sequence 20 of first images 22 based on the smoothed sequence 40 of zoom levels 42 and the smoothed sequence 80 of zoom positions 82, where the smoothed sequence 40 of zoom levels 42 vary a size of a crop 52 used on the sequence 20 of first images 22 to produce the sequence 60 of new images 62 and the smoothed sequence 80 of zoom positions 82 vary a position of the crop 52 used on the sequence 20 of first images 22 to produce the sequence 60 of new images 62.

Figure 9:
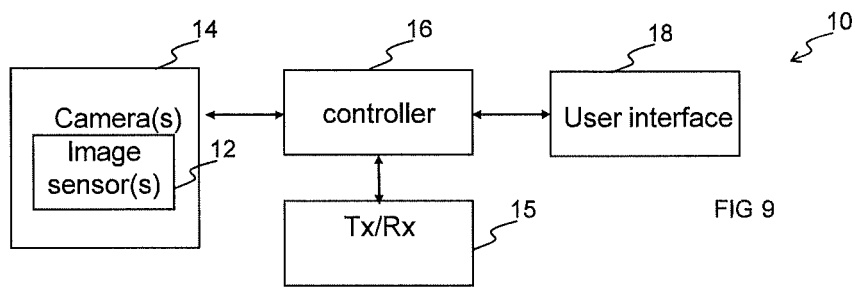
FIG. 9 illustrates an example of an apparatus as hardware components.

FIG. 9 illustrates another example of the apparatus 10 for smoothing zoom levels as previously described.

The apparatus 10 comprises one or more cameras 14, a controller 16, and a user interface. Optionally it comprises a data interface 15 that could for example be a jack, socket or radio transceiver.

Each camera 14 comprises at least one image sensor 12.

For the purposes of this example the controller 16 will have processing capabilities and memory storage capabilities. In other examples, these capabilities could be separated into different units. In some examples these capabilities can be distributed across multiple different apparatus. For example, the controller 16 could be in the same or a different apparatus to the camera(s) 14.

The controller 16 is configured to obtain a sequence 20 of first images 22 captured by an image sensor 12 and obtain image metadata 90 dependent upon a sequence 30 of zoom levels 32 where the sequence 30 of zoom levels 32 is a sequence corresponding to the sequence 20 of first images 22.

The controller 16 is configured to enhance zoom. The controller 16 is configured to use the image metadata 90 to obtain the sequence 30 of zoom levels 32. The controller 16 is configured to smooth the sequence 30 of zoom levels 32 to produce a smoothed sequence 40 of zoom levels 42. The controller 16 is configured to create a sequence 60 of new images 62 from the sequence 20 of first images 22 based on the smoothed sequence 40 of zoom levels 42, where the smoothed sequence 40 of zoom levels 42 vary a size of a crop 52 used on the sequence 20 of first images 22 to produce the sequence 60 of new images 62.

The controller 16 is optionally configured to store the created sequence 60 of new images 62, for example in a memory of the controller 16, a memory of the apparatus 10 or in an external memory accessed via the data interface 15.

The controller 16 is optionally configured to display the created sequence 60 of new images 62, for example in the user interface 18, a display of the apparatus 10 or in an external display accessed via the data interface 15.

The controller 16 is optionally configured to transmit the created sequence 60 of new images 62, for example via the data interface 15 which can, for example, comprise a radio transceiver or radio transmitter.

In some examples but not necessarily all examples, the controller 16 is configured to:

obtain the sequence 70 of zoom positions 72 of zoom crops; smooth the sequence 70 of zoom positions 72 to produce a smoothed sequence 80 of zoom positions 82; and create the sequence 60 of new images 62 from the sequence 20 of first images 22 based on the smoothed sequence 40 of zoom levels 42 and the smoothed sequence 80 of zoom positions 82 (where the smoothed sequence 40 of zoom levels 42 vary a size of a crop 52 used on the sequence 20 of first images 22 to produce the sequence 60 of new images 62 and the smoothed sequence 80 of zoom positions 82 vary a position of the crop 52 used on the sequence 20 of first images 22 to produce the sequence 60 of new images 62).

The user interface 18 can, in at least some examples provided a manual zoom control for varying, during capture of the sequence 20 of first images 22, a zoom level 32 used to define user-defined images of the captured scene. The sequence 30 of varying zoom levels 32 varying a magnification of the sequence of user-defined images.

The image metadata 90 records a sequence 30 of manual zoom levels 32 selected by a user or the metadata 90 defines a sequence 30 of manual viewfinder images selected by the user, a magnification of which defines a zoom level 32.

The controller 16 is configured to record (store in a memory for access) the sequence 20 of first images 22 captured by the image sensor 12 that include the user-defined images and extend beyond the user-defined images and is configured to record (store in a memory for access) the image metadata 90 for the first images 22 dependent upon the sequence 30 of varying manual zoom levels 32.

The user-defined images can be viewfinder images framed by a viewfinder used to indicate recording of the sequence of user-defined images, while recording the sequence 20 of first images 22.

Figure 10:
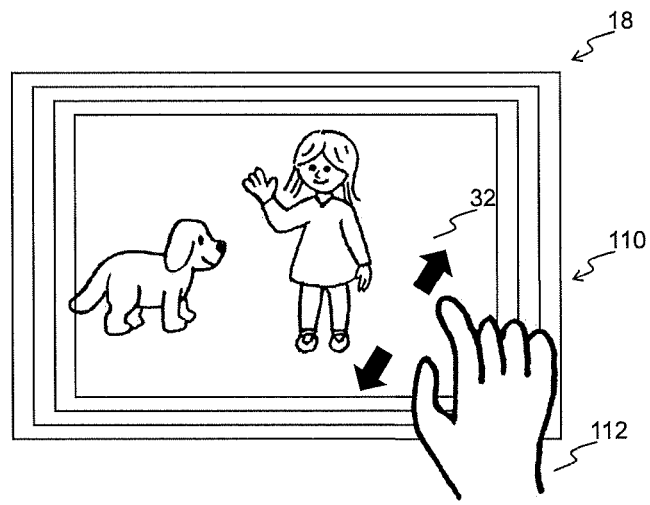
FIG. 10 illustrates an example of a user interface for the apparatus.

In at least some examples, the user interface 18 comprises a touch-sensitive display 110, for example, as illustrated in FIG. 10. The touch-sensitive display 110 can be used as a viewfinder and displays the user-defined images, framed by user control, during capture. The touch-sensitive display 110 can be used for manual control of zoom levels 32 during capture. For example, a hand 112 of a user can touch the touch-sensitive display at two places simultaneously and move the touch-points relative to each other. Moving the touch-points away from each other causes a zoom-in and decreases the size of the notional crop used to define the user-defined image. Moving the touch-points towards each other causes a zoom-out and increases the size of the notional crop used to define the user-defined image. Thus a pinch-in or pinch-out can be used to control zoom-out and zoom-in. It can be difficult to control zoom levels 32 using a pinch gesture in an accurate and timely manner In other examples, the user interface 18 additionally or alternatively comprises a hardware or software input such as a button for causing zoom-in and a hardware or software input such as a button for causing zoom-out. Touching the zoom-in button changes the zoom levels 32 in increments to cause digital zoom-in and decreases the size of the notional crop used to define the user-defined image. Touching the zoom-out button changes the zoom levels 32 in increments to cause digital zoom-out and increases the size of the notional crop used to define the user-defined image. It can be difficult to control zoom levels 32 using buttons in an accurate and timely manner.

FIG. 11 illustrates an example of a method 200 that comprises at block 210 obtaining a sequence 30 of zoom levels 32, for example, from image metadata 90 dependent upon a sequence 30 of zoom levels 32. The sequence 30 of zoom levels 32 is a sequence corresponding 92 to a sequence 20 of first images 22.

The method 200 comprises, at block 212 smoothing the sequence 30 of zoom levels 32 to produce a smoothed sequence 40 of zoom levels 42.

The method 200 comprises, at block 214, creating a sequence 60 of new images 62 from a sequence 20 of first images 22 based on the smoothed sequence 40 of zoom levels 42, where the sequence 20 of first images 22 is a sequence corresponding to the smoothed sequence of zoom levels and the smoothed sequence 40 of zoom levels 42 varies a size of a crop 52 used on the sequence 20 of first images 22 to produce the sequence 60 of new images 62.

Optionally at block 216, the method 200 comprises outputting images, for example, by storing, displaying and/or transmitting the created sequence 60 of new images 62.

FIG. 12 illustrates an example of a controller 16. Implementation of a controller 16 may be as controller circuitry. The controller 16 may be implemented in hardware alone, have certain aspects in software including firmware alone or can be a combination of hardware and software (including firmware).

As illustrated in FIG. 12 the controller 16 may be implemented using instructions that enable hardware functionality, for example, by using executable instructions of a computer program 106 in a general-purpose or special-purpose processor 102 that may be stored on a computer readable storage medium (disk, memory etc.) to be executed by such a processor 102.

The processor 102 is configured to read from and write to the memory 104. The processor 102 may also comprise an output interface via which data and/or commands are output by the processor 102 and an input interface via which data and/or commands are input to the processor 102.

The memory 104 stores a computer program 106 comprising computer program instructions (computer program code) that controls the operation of the apparatus 10 when loaded into the processor 102. The computer program instructions, of the computer program 106, provide the logic and routines that enables the apparatus to perform the methods illustrated in the FIGS. The processor 102 by reading the memory 104 is able to load and execute the computer program 106.

The apparatus 10 therefore comprises:

at least one processor 102; and at least one memory 104 including computer program code the at least one memory 104 and the computer program code configured to, with the at least one processor 102, cause the apparatus 10 at least to perform:

obtaining a sequence 30 of zoom levels 32;

smoothing the sequence 30 of zoom levels 32 to produce a smoothed sequence 40 of zoom levels 42;

creating a sequence 60 of new images 62 from a sequence 20 of first images 22 based on the smoothed sequence 40 of zoom levels 42, wherein the sequence 20 of first images 22 is a sequence corresponding to the smoothed sequence 40 of zoom levels 42 and the smoothed sequence 40 of zoom levels 42 vary a size of a crop 52 used on the sequence 20 of first images 22 to produce the sequence 60 of new images 62; and outputting, for example by storing, displaying or transmitting, the created sequence 60 of new images 62 with enhanced zoom.

As illustrated in FIG. 13, the computer program 106 may arrive at the apparatus 10 via any suitable delivery mechanism 108. The delivery mechanism 108 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 106. The delivery mechanism may be a signal configured to reliably transfer the computer program 106. The apparatus 10 may propagate or transmit the computer program 106 as a computer data signal.

Computer program instructions for causing an apparatus 10 to perform at least the following or for performing at least the following:

obtaining a sequence 30 of zoom levels 32;

smoothing the sequence 30 of zoom levels 32 to produce a smoothed sequence 40 of zoom levels 42;

creating a sequence 60 of new images 62 from a sequence 20 of first images 22 based on the smoothed sequence 40 of zoom levels 42, wherein the sequence 20 of first images 22 is a sequence corresponding to the smoothed sequence of zoom levels and the smoothed sequence 40 of zoom levels 42 vary a size of a crop 52 used on the sequence 20 of first images 22 to produce the sequence 60 of new images 62; and storing, displaying or transmitting the created sequence 60 of new images 62 with enhanced zoom.

The computer program instructions may be comprised in a computer program, a non-transitory computer readable medium, a computer program product, a machine readable medium. In some but not necessarily all examples, the computer program instructions may be distributed over more than one computer program.

Although the memory 104 is illustrated as a single component/circuitry it may be implemented as one or more separate components/circuitry some or all of which may be integrated/removable and/or may provide permanent/semi-permanent/dynamic/cached storage.

Although the processor 102 is illustrated as a single component/circuitry it may be implemented as one or more separate components/circuitry some or all of which may be integrated/removable. The processor 102 may be a single core or multi-core processor.

Figure 14:
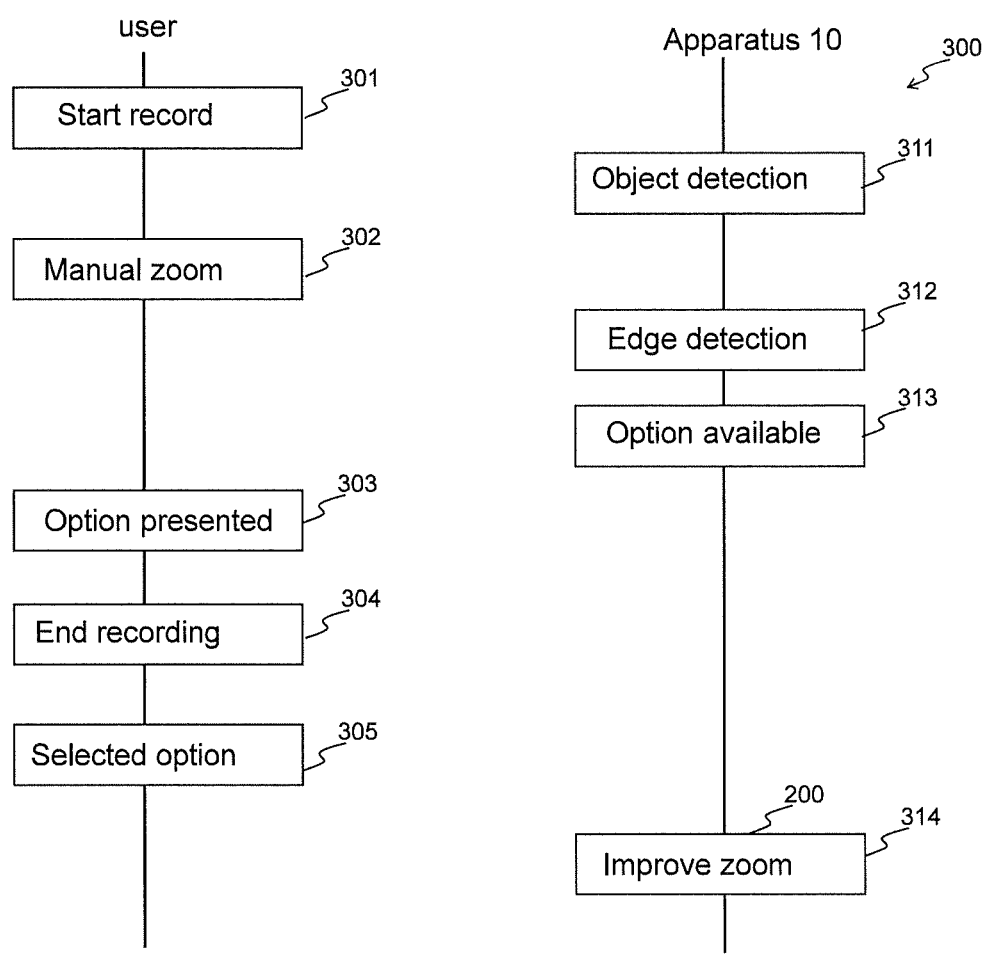
FIG. 14 illustrates an example of a method for improving zoom using object detection.
Figure 15:
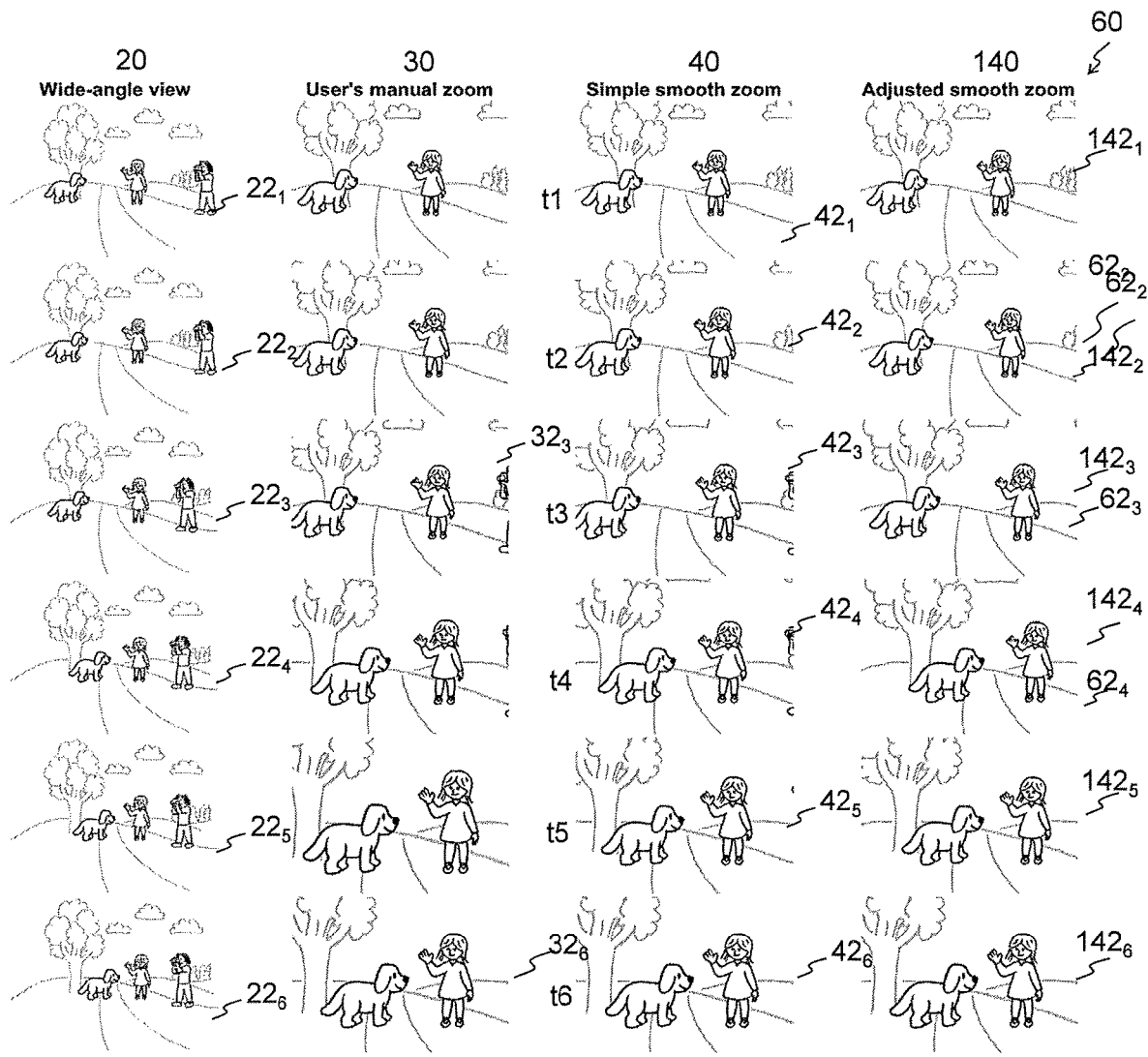
FIG. 15 illustrates an example of improving zoom for a sequence of images using object detection.
Figure 16:
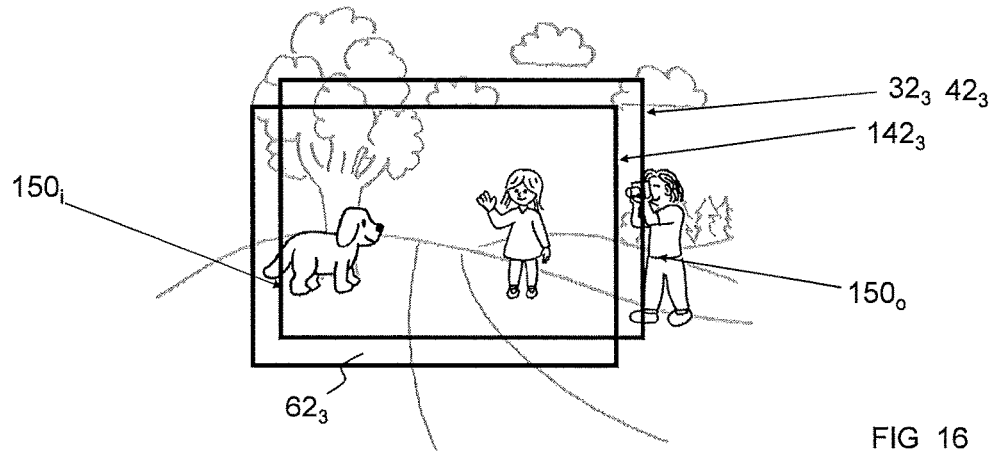
FIG. 16 illustrates an example of improving zoom for an image using at least re-sizing of a crop.

FIGS. 14, 15, 16 illustrates examples in which automated object tracking is used to control the smoothed sequence 40 of zoom levels (and optionally the smoothed sequence 80 of zoom positions 82).

An object 150 can be tracked using computer vision procedures. For example, an object 150 can be defined as a collection of features and this collection of features can be tracked within an image. In some examples, a reference collection of interest points can be mapped to a corresponding collection of interests point via a homography.

The controller 16 can for example be configured to track an object 150 in the sequence 20 of first images 22 and to create the sequence 60 of new images 62 in dependence upon the tracked object 150.

In some examples, the tracked object 150 can be a desirable object $150_i$ and the controller 16 is configured to create the sequence 60 of new images 62 to include the desirable object $150_i$ within the new images 62. The size and/or position of the crop 52 can be adjusted to include within the crop 52 the desirable object $150_i$.

In some examples, the tracked object 150 can be an undesirable object $150_o$ and the controller 16 is configured to create the sequence 60 of new images 62 to exclude the undesirable object $150_o$ from the new images 62. The size and/or position of the crop 52 can be adjusted to exclude from the crop 52 the undesirable object $150_o$.

The controller 16 can be configured to select automatically an object 150 to be tracked. The controller 16 can be configured to automatically classify an object 150 as a desirable object $150_i$ or an undesirable object $150_o$.

For example, the controller 16 can be configured to automatically classify an object 150 as a tracked desirable object $150_i$ based upon at least a frequency of occurrence of the tracked object 150 within the sequence of user-defined images defined by the sequence 20 of first images 22 and the corresponding sequence 30 of manual zoom levels 32, where the corresponding sequence 30 of zoom levels 32 defines a variable crop 52 that defines the user-defined images within the first images 22. For example, an object 150 that is in (or partially in) all (or most) of the user-defined images can be classified as a tracked desirable object $150_i$. For example, additionally or alternatively, the controller 16 can be configured to classify an object 150 as a tracked undesirable object $150_o$ based upon at least a frequency of occurrence of the tracked object 150 within the sequence of user-defined images defined by the sequence 20 of first images 22 and the corresponding sequence 30 of manual zoom levels 32. For example, an object 150 that is outside (or partially outside) all (or most) of the user-defined images can be classified as a tracked undesirable object $150_o$.

For example, the controller can be configured to classify an object 150 as a tracked desirable object $150_i$ based upon detection of changes in zoom levels 32 within the sequence 30 of zoom levels 32.

In at least some examples, the controller 16 can be configured to classify an object 150 as a tracked desirable object $150_i$ based upon detection of changes in zoom levels 32 within the sequence 30 of zoom levels 32 that are responsive to an object 150 leaving or potentially leaving a sequence of user-defined images. The user-defined images are defined by the sequence 20 of first images 22 and the corresponding sequence 30 of zoom levels 32, where the corresponding sequence 30 of zoom levels 32 defines a variable crop 52 that defines the user-defined images within the first images 22. For example, if, when a particular object 150 leaves a user-defined image there is a change in position of the zoom or a zoom-out to bring that object 150 back-within the user-defined image then that object 150 can be automatically classified as a targeted desirable object $150_i$. For example, if, when, for example on a number of occasions, a particular object 150 approaches an edge of the user-defined image there is a change in position of the zoom or a zoom-out to bring that object 150 away from the edge of the user-defined image then that object 150 can be automatically classified as a targeted desirable object $150_i$.

For example, the controller 16 can be configured to classify an object as a tracked undesirable object $150_o$ based upon detection of changes in zoom levels within the sequence 30 of zoom levels 32, that are responsive to an object 150 entering a sequence of user-defined images. The user-defined images are defined by the sequence 20 of first images 22 and the corresponding sequence 30 of zoom levels 32, where the corresponding sequence 30 of zoom levels 32 defines a variable crop that defines the user-defined images within the first images. For example, if, when a particular object 150 enters a user-defined image there is a change in position of the zoom or a zoom-in to bring that object 150 back outside the user-defined image then that object 150 can be automatically classified as a targeted undesirable object $150_g$.

In the preceding paragraphs, the actions of the controller 16, for example classification, can be automatic. This is to include within its scope fully automatic operation that occurs without a required user input and also include within its scope semi-automatic operation that completes after a confirmatory user input.

In some but not necessarily all examples, the apparatus 10 is configured to automatically, without user input at the apparatus 10, or semi-automatically, with prompted user input at the apparatus 10, create the sequence 60 of new images 62 from the sequence 20 of first images 22 based on the smoothed sequence 40 of zoom levels 42.

In some but not necessarily all examples, the user interface 18 of the apparatus 10 can be configured to provide to the user, an option that enables a user to confirm whether or not smoothing of the sequence 30 of zoom levels 32 should or should not occur. For example, a selectable option can indicate that smoothing of the zoom levels (or zoom levels and zoom positions) is available.

In some but not necessarily all examples, the user interface 18 of the apparatus 10 can be configured to provide to the user, an option that enables a user to confirm whether or not an identified object 150 should be tracked and/or whether an identified object 150 should be tracked as a desirable object $150_i$ for inclusion and/or whether an object should be tracked as an undesirable object $150_o$ for exclusion.

Referring to FIG. 14, at block 301, the user selects an option at the apparatus 10 to start capturing the sequence 20 of first images 22. At block 302, the user performs manual control of zoom levels 32. The sequence 30 of manual zoom levels 32 are recorded as metadata 90.

Meanwhile, at block 311, the apparatus 10 performs object detection identifying a targeted desirable object. The apparatus 10, at block 312, identifies that the targeted desirable object is approaching an edge of the user-defined image, and at block 313 presents a user-selectable option for improving zoom.

Objects close to the borders/edges of the user-defined image can be kept either completely inside the user-defined image (desirable object $150_i$) or completely outside of it (undesirable object $150_o$).

At block 303, the option for improved zoom is presented to the user. At block 304, the user finishes capturing of images 22 and at block 305 selects the option for improved zoom. Then at block 314 the apparatus 10 performs improved zoom controlling at least a size of the crop 52 used on the sequence 20 of first images 22 to maintain the targeted desirable object $150_i$ within the sequence 60 of new images 62.

FIG. 15 illustrates an example of:

a sequence 20 of first images 22 (first column);

a sequence 30 of manual zoom levels 32 defining, via a sequence of notional crops on the first images 22, a sequence of user-defined images (second column);

a smoothed sequence 40 of zoom levels 42 defining, via a sequence of notional crops on the first images 22, a smoothed sequence of images (third column); and an adjusted smoothed sequence 140 of zoom levels 142 defining, via a sequence of crops on the first images 22, an adjusted smoothed sequence of images 62 (fourth column).

It can be seen that the dog mostly appears as a whole within the smoothed sequence of images (third column) defined by the smoothed sequence 40 of zoom levels 42. Part of the dog is excluded at time t3. The dog is identified as a targeted desirable object $150_i$. The smoothed sequence 40 of zoom levels is adjusted to form an adjusted smoothed sequence 140 of zoom levels 142. The adjusted smoothed sequence 140 of zoom levels 142 is used to define a sequence of crops applied to the sequence 20 of first images 22 to form the sequence 60 of new images 62. The new images 62 at time t3 include all of the dog.

It can be seen that the camera mostly does not appear within the smoothed sequence of images (third column) defined by the smoothed sequence 40 of zoom levels 42. Part of the camera is included to the right at times t3, t4 and t5. The camera is identified as a targeted undesirable object $150_o$. The smoothed sequence 40 of zoom levels is adjusted to form an adjusted smoothed sequence 140 of zoom levels 142. The adjusted smoothed sequence 140 of zoom levels 142 is used to define a sequence of crops applied to the sequence 20 of first images 22 to form the sequence 60 of new images 62. The new images 62 at times t3, t4 and t5 exclude all of the camera.

FIG. 16 illustrates a re-sizing and repositioning of a crop applied to a first image $22_3$ at time t3. A crop defined by the zoom level $42_3$ at time t3 in the smoothed sequence 40 of zoom levels 42 is adjusted to form a new crop defined by the zoom level $142_3$ at time t3 in the adjusted smoothed sequence 140 of zoom levels 142. A similar FIG. could be used to illustrate re-sizing and repositioning of a crop defined by the zoom level $32_3$ at time t3 in the sequence 30 of manual zoom levels 42 to form a new crop defined by a zoom level $142_3$ at time t3 in an adjusted smoothed sequence 140 of zoom levels 142. In the example illustrated both the size and position of the zoom (the size and position of the crop) is adjusted. In other examples only the size of the zoom (the size of the crop) is adjusted.

The adjusted smoothed sequence 140 of zoom levels 142 is used to define a sequence of crops applied to the sequence 20 of first images 22 to form the sequence 60 of new images 62. The new image $62_3$ based on the adjusted zoom level $142_3$ includes all of the targeted desirable object $150_i$ and excludes all of the targeted undesirable object $150_o$.

Objects 150 that are predominantly part of the manually zoomed content (user-defined image) are kept within the smoothed zoom region (the crop) if possible. Objects 150 that are predominantly outside the manually zoomed region (user-defined image) are kept outside the smoothed zoom region (the crop) if possible.

Optionally, the user can also select objects 150 displayed in a viewfinder display of the user interface 18, for example by touching them, to mark them as objects of interests that should be targeted desirable object $150_i$ included in the new images 62.

The apparatus 10 is configured to obtain a sequence 20 of first images from a first camera 14 using an image sensor 12.

Figure 17:
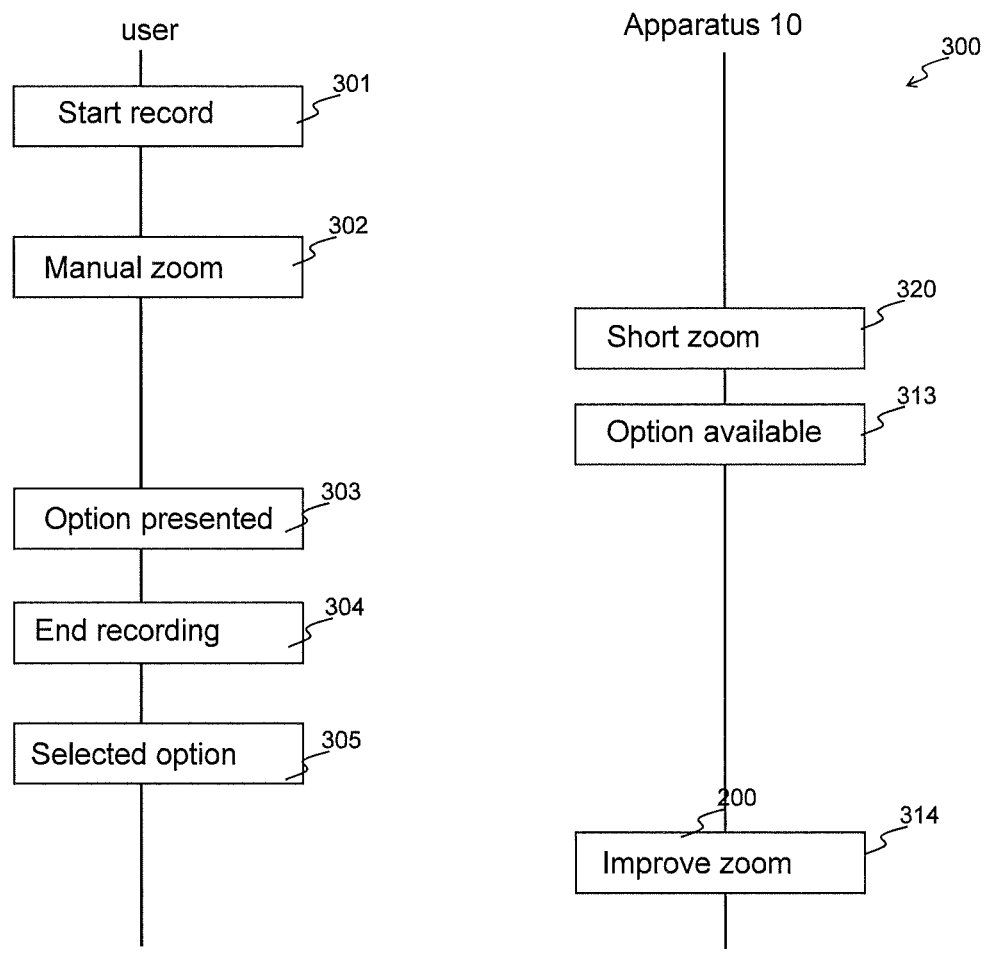
FIG. 17 illustrates an example of a method for improving zoom.
Figure 18:
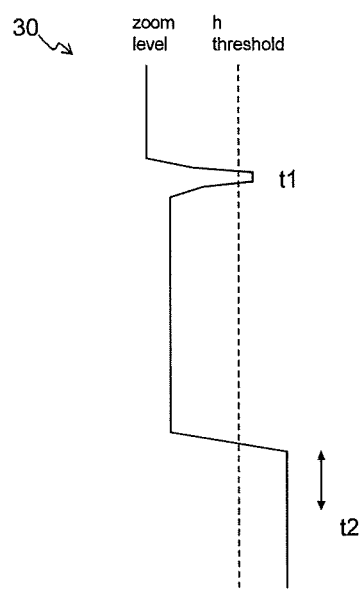
FIG. 18 illustrates an example of a sequence of zoom levels.
Figure 19:
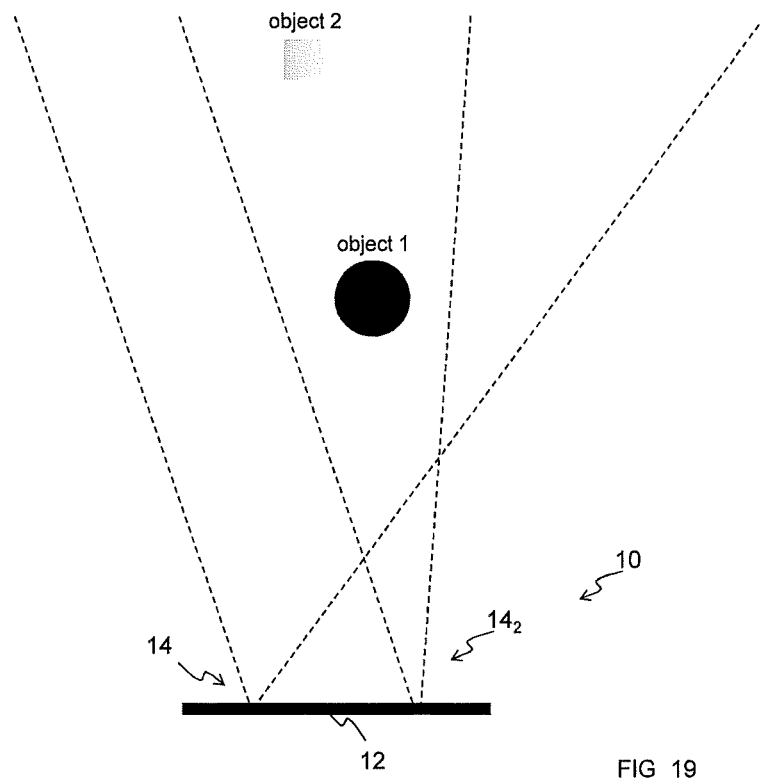
FIG. 19 illustrates an example of a multi-camera apparatus 10.

FIGS. 17, 18, 19. 20A, 20B illustrate examples in which the apparatus 10 is also configured to obtain a sequence of further images (different to the first images 22) captured by a further second camera $14_2$ using the same image sensor 12 or a different image sensor $12_2$.

Referring to FIG. 19, the apparatus 10 has multiple cameras. A first camera 14 and a second camera $14_2$ have different optics and have different optical zoom levels (which results in different fields of view). For example, the first camera 14 can have a wide-angle lens and the second camera 142 can have a telephoto lens (or vice versa). The first camera 14 and the second camera 142 can have different image sensors 12, $12_2$ or can share a common image sensor 12.

Figure 20A:
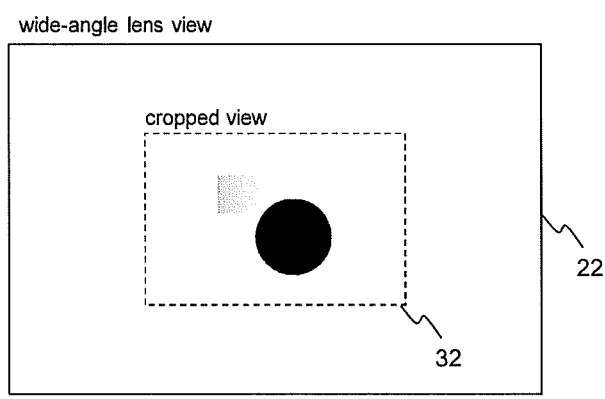
FIG. 20A illustrates an example of an image captured by one of the multiple cameras.

FIG. 20A illustrates a first image 22 captured by the first camera 14. It also shows the current zoom level 32. As previously described the first image 22 can be part of a captured sequence 20 of first images 22 and the zoom level 32 can be a corresponding part of a corresponding sequence 30 of manual zoom levels 32. The sequence 30 of zoom levels can be modified as described previously to produce a modified sequence 40, 140 of zoom levels 42, 142, which are used to crop the first images 22 in the sequence 20 of first images 22 to create the sequence 60 of new images 62.

Figure 20B:
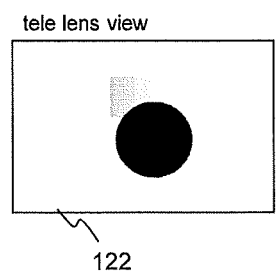
FIG. 20B illustrates an example of an image captured by a different one of the multiple cameras.

FIG. 20B illustrates a further image 122 captured by the second camera $14_2$. The further image 122 is subject to optical zoom by a telephoto lens.

In some examples, the apparatus 10 can record the first images 22 and the further images 122 simultaneously. In other examples, the apparatus 10 decides whether to record the first images 22 or the further images 122.

Also, if the first images 22 are recorded a decision may need to be taken whether or not to adapt the sequence 30 of zoom levels 32 to create a modified sequence 40, 140 of zoom levels 42, 142 for creating the sequence 60 of new images 62.

Thus, the apparatus 10 can be configured to obtain a sequence of further images 122 (different to the first images 22) captured by a further second camera $14_2$ using the same image sensor 12 or a different image sensor $12_2$.

The optical field of view of the further images 122 is different to the optical field of view of the first images 22, and enhancing zoom can comprise: switching between creating a sequence 60 of new images 62 from the sequence 20 of first images 22 based on the smoothed sequence 40 of zoom levels 42 and creating the sequence 60 of new images 62 from the sequence of further images 122. In at least some examples, the zoom enhancement can occur in post-production.

Where the field of view of the further images 122 is smaller than the field of view of the first images 22, switching to creating the sequence 60 of new images 62 from the sequence of further images 122 can occur in response to sustained zooming in during the sequence 30 of zoom levels 32.

Where the field of view of the further images 122 is larger than the field of view of the first images 22, switching to creating the sequence 60 of new images 62 from the sequence of further images can occur in response to sustained zooming out in the sequence 30 of zoom levels 32.

FIG. 18 illustrates an example of a sequence 20 of manual zoom levels 32. At time t1, the zoom level exceeds a threshold for less than a threshold period of time. The apparatus 10 performs digital zoom. It produces the sequence 60 of new images 62 based on an appropriate sequence 30, 40, 140 of zoom levels 32, 42, 142.

At time t2, the zoom level has exceeded the threshold for more than a threshold period of time. At this time, the apparatus 10 switches from using digital zoom to using optical zoom. It switches from using the first camera 14 and its first images 22 to produce the output sequence of images based on the first images 22 to using the second camera $14_2$ and its further images 122 to produce an output sequence of images based on the further images. In at least some examples, the zoom enhancement based on the switch can occur in post-production.

Referring to FIG. 17, at block 301, the user selects an option at the apparatus 10 to start capturing the sequence 20 of first images 22 and images 122. At block 302, the user performs manual control of zoom levels 32. The zoom levels 32 can control a viewfinder image used for capturing the images. The sequence 30 of manual zoom levels 32 are recorded as metadata 90.

Meanwhile, at block 320, the apparatus 10 detects that a zoom level has exceeded a threshold. The apparatus 10, at block 313 presents a user-selectable option for improving zoom. The option presented can be dependent upon whether or not the zoom threshold has or has not been exceeded for a threshold period of time. For example, the option can be an option for digital zoom based on images 22 if the zoom threshold has not been exceeded for a threshold period of time and the option can be or can include an option for optical zoom based on images 122 if the zoom threshold has not been exceeded for a threshold period of time.

At block 303, the option for improved zoom is presented to the user. At block 304, the user finishes capturing of images 22, 122 and at block 305 selects the option for improved zoom. Then at block 314 the apparatus 10 performs improved zoom. The apparatus 10 can for example improve digital zoom by controlling at least a size of the crop 52 used on the sequence 20 of first images to create the sequence 60 of new images 62. The apparatus 10 can for example improve zoom by controlling switching between the first images 22 and the images 122 when creating the output images.

Data from all cameras are stored. If the zoom level has exceeded a threshold for more than a threshold period of time, and there are further images 122 available, the user may be presented with an option to switch from using the first images 22 to produce the output sequence 60 of images 62 to continue that sequence 60 using the further images 122.

After the recording is completed, camera switches are optimized so that good image quality is obtained, but camera switches are minimized if zooming actions require the camera to be switched for a short time only. After the video is recorded, a post-processing phase makes camera switches only in cases where the new zoom level is used for a long period of time. For short zooming periods, digital crop zoom is used instead. This avoids, for example, small jumps in perspective caused by the parallax effect that can otherwise become noticeable due to subject distance.

If the apparatus 10 has more than two cameras 14, it is possible to save storage space, processing, and battery power by storing data only from the currently active camera and the one with an optical zoom magnification closest to the current zoom level 32.

The above-described methods improve the perceived quality of zooming actions that are usually controlled manually by the user during recording. The methods can be performed in post-production.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. may represent steps in a method and/or sections of code in the computer program 106. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer memory such as a circular buffer memory, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' or 'record' in relation to an image relates to permanent recording of the data of the image.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

For example, the recognition of an object can be performed by machine learning;

For example, the classification of an object 150 as tracked or not tracked can be performed by machine learning.

For example, the classification of an object as a tracked desirable object $150_i$ can be performed by machine learning.

For example, the classification of an object as a tracked undesirable object $150_o$ can be performed by machine learning.

As used here 'module' refers to a unit or apparatus that excludes certain parts/components that would be added by an end manufacturer or a user. The controller can be a module. The cameras can be modules.

The above-described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples.

Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one non-transitory memory storing instructions that, when executed with the at least one processor, cause the apparatus to perform at least the following:

obtain a sequence of first images captured with an image sensor;

classify at least one object in the sequence of first images in regard to at least one classification;

obtain image metadata dependent upon a sequence of zoom levels, wherein the sequence of zoom levels is a sequence corresponding to the sequence of first images;

use the image metadata to obtain the sequence of zoom levels;

smooth the sequence of zoom levels to produce a smoothed sequence of zoom levels;

create a sequence of new images from the sequence of first images based on the smoothed sequence of zoom levels and the at least one classification of the at least one object, wherein the smoothed sequence of zoom levels vary a size of a crop used on the sequence of first images to produce the sequence of new images;

track the at least one object in the sequence of first images;

create the sequence of new images to include the tracked at least one object within the new images;

select the at least one object to be tracked based upon detection of changes in zoom levels within the sequence of zoom levels, that are responsive to the at least one object leaving a sequence of second user-defined images defined with the sequence of first images and the corresponding sequence of zoom levels, wherein the corresponding sequence of zoom levels defines a variable crop that defines the second images within the first images; and store, display or transmit the created sequence of new images.

2. The apparatus as claimed in claim 1, where the instructions, when executed with the at least one processor, are configured to cause the apparatus to create the sequence of new images from the sequence of first images which varies a size and position of a crop used on the sequence of first images to produce the sequence of new images.

3. The apparatus as claimed in claim 1, wherein the image metadata defines a sequence of manual zoom levels selected by a user or the image metadata defines a sequence of manual viewfinder images selected by the user, a magnification of which defines a zoom level.

4. The apparatus as claimed in claim 1, wherein the first images in the sequence of first images comprises a second user-defined image defined with the zoom level of the corresponding sequence of zoom levels and additional image portions that extend beyond the second image, wherein the corresponding sequence of zoom levels defines a crop that defines the second images within the first images and wherein the metadata is dependent upon varying zoom levels defining the sequence of second images.

5. The apparatus as claimed in claim 4, wherein the second images are viewfinder images framed with a viewfinder used to indicate recording of the sequence of second images, while recording the sequence of first images.

6. The apparatus as claimed in claim 1, where the instructions, when executed with the at least one processor, are configured to cause the apparatus to select the at least one object to be tracked based upon at least a frequency of occurrence of the tracked at least one object within a sequence of second user-defined images defined with the sequence of first images and the corresponding sequence of zoom levels, wherein the corresponding sequence of zoom levels defines a variable crop that defines the second images within the first images.

7. The apparatus as claimed in claim 1, where the instructions, when executed with the at least one processor, are configured to cause the apparatus to enable user selection of the at least one object to be tracked.

8. The apparatus as claimed in claim 1, where the instructions, when executed with the at least one processor, are configured to cause the apparatus to obtain a sequence of further images captured with a further image sensor wherein a field of view of further images is different to a field of view of the first images, wherein the enhancing zoom comprises:

switching between creating a sequence of new images from the sequence of first images based on the smoothed sequence of zoom levels, and creating a sequence of new images from the sequence of further images.

9. The apparatus as claimed in claim 1 where the instructions, when executed with the at least one processor, are configured to cause the apparatus to perform at least one of:

the classifying of the at least one object as desirable or undesirable, use a confirmation by a user whether the at least one object should be tracked, or should be considered as desirable or undesirable, define a collection of features as the at least one object, or obtain another sequence of the first images, captured with another image sensor, and use the sequence of the first images and the another sequence of the first images to identify a common object to at least partially form the at least one object.

10. An apparatus comprising:

at least one processor; and at least one non-transitory memory storing instructions that, when executed with the at least one processor, cause the apparatus to perform at least the following:

obtain a sequence of first images captured with an image sensor;

classify at least one object in the sequence of first images in regard to at least one classification;

obtain image metadata dependent upon a sequence of zoom levels, wherein the sequence of zoom levels is a sequence corresponding to the sequence of first images;

use the image metadata to obtain the sequence of zoom levels;

smooth the sequence of zoom levels to produce a smoothed sequence of zoom levels;

create a sequence of new images from the sequence of first images based on the smoothed sequence of zoom levels and the at least one classification of the at least one object, wherein the smoothed sequence of zoom levels vary a size of a crop used on the sequence of first images to produce the sequence of new images;

track the at least one object in the sequence of first images;

create the sequence of new images to exclude the tracked at least one object within the new images;

select the at least one object to be tracked based upon detection of changes in zoom levels within the sequence of zoom levels, that are responsive to the at least one object entering a sequence of second user-defined images defined with the sequence of first images and the corresponding sequence of zoom levels, wherein the corresponding sequence of zoom levels defines a variable crop that defines the second images within the first images; and store, display or transmit the created sequence of new images.

11. The apparatus as claimed in claim 10, where the instructions, when executed with the at least one processor, are configured to cause the apparatus to select the at least one object to be tracked based upon at least a frequency of occurrence of the tracked at least one object within a sequence of second user-defined images defined with the sequence of first images and the corresponding sequence of zoom levels, wherein the corresponding sequence of zoom levels defines a variable crop that defines the second images within the first images.

12. A non-transitory computer readable medium comprising program instructions stored thereon for performing at least the following:

obtaining a sequence of zoom levels;

classifying at least one object in the sequence of first images in regard to at least one classification;

smoothing the sequence of zoom levels to produce a smoothed sequence of zoom levels;

creating a sequence of new images from a sequence of first images based on the smoothed sequence of zoom levels and the at least one classification of the at least one object, wherein the sequence of first images is a sequence corresponding to the smoothed sequence of zoom levels and the smoothed sequence of zoom levels vary a size of a crop used on the sequence of first images to produce the sequence of new images;

tracking the at least one object in the sequence of first images;

creating the sequence of new images to include the tracked at least one object within the new images;

select the at least one object to be tracked based upon detection of changes in zoom levels within the sequence of zoom levels, that are responsive to at least one of:

the at least one object leaving a sequence of second user-defined images defined with the sequence of first images and the corresponding sequence of zoom levels, or the at least one object entering a sequence of second user-defined images defined with the sequence of first images and the corresponding sequence of zoom levels, wherein the corresponding sequence of zoom levels defines a variable crop that defines the second images within the first images; and storing, displaying or transmitting the created sequence of new images with enhanced zoom.

13. A method comprising:

obtaining a sequence of zoom levels;

classifying at least one object in the sequence of first images in regard to at least one classification;

smoothing the sequence of zoom levels to produce a smoothed sequence of zoom levels;

creating a sequence of new images from a sequence of first images based on the smoothed sequence of zoom levels and the at least one classification of the at least one object, wherein the sequence of first images is a sequence corresponding to the smoothed sequence of zoom levels and the smoothed sequence of zoom levels vary a size of a crop used on the sequence of first images to produce the sequence of new images;

tracking the at least one object in the sequence of first images;

creating the sequence of new images to include the tracked at least one object within the new images;

select the at least one object to be tracked based upon detection of changes in zoom levels within the sequence of zoom levels, that are responsive to at least one of:

the at least one object leaving a sequence of second user-defined images defined with the sequence of first images and the corresponding sequence of zoom levels, or the at least one object entering a sequence of second user-defined images defined with the sequence of first images and the corresponding sequence of zoom levels, wherein the corresponding sequence of zoom levels defines a variable crop that defines the second images within the first images; and storing, displaying or transmitting the created sequence of new images with enhanced zoom.

14. The method as claimed in claim 13, further comprising creating the sequence of new images from the sequence of first images based on the smoothed sequence of zoom levels, varies a size and position of a crop used on the sequence of first images to produce the sequence of new images.

15. The method as claimed in claim 13, wherein the image metadata defines a sequence of manual zoom levels selected by a user or the image metadata defines a sequence of manual viewfinder images selected by the user, a magnification of which defines a zoom level.

16. The method as claimed in claim 13, wherein each of the first images in the sequence of first images comprises a second user-defined image defined with the zoom level of the corresponding sequence of zoom levels and additional image portions that extend beyond the second image, wherein the corresponding sequence of zoom levels defines a crop that defines the second images within the first images and wherein the metadata is dependent upon varying zoom levels defining the sequence of second images.

17. The method as claimed in claim 16, wherein the second images are viewfinder images framed with a viewfinder used to indicate recording of the sequence of second images, while recording the sequence of first images.

* * * * *